UNITED STATES PATENT OFFICE.

OTIS W. SEVERNS, OF CHICAGO, ILLINOIS.

SWEEPING COMPOSITION.

966,060.

Specification of Letters Patent. Patented Aug. 2, 1910.

No Drawing. Application filed April 15, 1908. Serial No. 427,215.

*To all whom it may concern:*

Be it known that I, OTIS W. SEVERNS, a citizen of the United States, residing at Chicago, in the county of Cook and State of Illinois, have invented certain new and useful Improvements in Sweeping Compositions, of which the following is a specification.

This invention relates to dust collecting or absorbing substances and has particular reference to a material which, while adapted for general use for the purpose mentioned, is especially adapted for use on carpeted floors, rugs and the like.

The most important feature of my invention resides in the provision of a novel absorbent base to contain the oil or like material employed to collect the dust particles in the use of the composition.

I have discovered that comminuted or ground corn cobs is a particularly advantageous absorbent material for use in producing a dust-collecting or absorbing substance.

In the practice of my invention I first finely grind corn cobs and add to the ground material about one-sixth of its weight of heavy mineral oil. The resulting compound is an efficient agent for the purpose specified. I prefer, however, to employ sand and a disinfectant and perfume in producing my composition. The materials are preferably mixed in the following proportion:

| | |
|---|---|
| Cob meal | 60 lbs. |
| Sand | 30 lbs. |
| Heavy mineral oil | 10 lbs. |
| Disinfectant | 1/2 lb. |
| Perfume | 1/10 lb. |

Any solid or liquid disinfectant may be employed but I prefer to use a disinfectant manufactured by Park, Davis & Co. and sold under the trade name of "Creso." Similarly any perfume may be employed but I prefer to use citronella.

It is to be understood that the proportions of the various ingredients mentioned may be widely varied and that certain of the ingredients may be omitted as hereinbefore indicated without departing from the spirit of the invention or the scope of the appended claims.

Having described my invention, I claim,

1. A composition of the character described, comprising comminuted corn-cobs and a dust-holding material, said composition being moist and in a relatively finely divided condition and adapted to be swept over carpets to remove dust therefrom without smearing or staining.

2. A composition of the character described, comprising comminuted corn-cobs and oil, said composition being moist and in a relatively finely divided condition and adapted to be swept over carpets to remove dust therefrom without smearing or staining.

3. A composition of the character described, comprising comminuted corn-cobs and a mineral oil, said composition being adapted to be swept over carpets to remove dust therefrom, without smearing or staining.

4. A composition of the character described, comprising comminuted corn-cobs and a heavy mineral oil, said composition being adapted to be swept over carpets to remove dust therefrom, without smearing or staining.

5. A dust collecting or absorbing substance comprising comminuted cobs, oil and sand.

6. A dust collecting or absorbing substance comprising comminuted cobs, oil, sand, a disinfectant and a perfume.

In testimony whereof I affix my signature in presence of two witnesses.

OTIS W. SEVERNS.

Witnesses:
WM. SEVERNS,
LOUISE M. JENSEN.